(12) United States Patent
Brueck et al.

(10) Patent No.: US 8,925,307 B2
(45) Date of Patent: Jan. 6, 2015

(54) METHOD FOR OPERATING A METERING APPARATUS, METERING APPARATUS AND MOTOR VEHICLE HAVING A METERING APPARATUS

(71) Applicant: EMITEC Gesellschaft fuer Emissionstechnologie mbH, Lohmar (DE)

(72) Inventors: Rolf Brueck, Bergisch Gladbach (DE); Jan Hodgson, Troisdorf (DE); Sven Schepers, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/867,527

(22) Filed: Apr. 22, 2013

(65) Prior Publication Data

US 2013/0232954 A1    Sep. 12, 2013

Related U.S. Application Data

(63) Continuation of application No. PCT/EP2011/067950, filed on Oct. 14, 2011.

(30) Foreign Application Priority Data

Oct. 20, 2010 (DE) .......................... 10 2010 049 071

(51) Int. Cl.
  *F01N 3/20*       (2006.01)
(52) U.S. Cl.
  CPC .......... *F01N 3/208* (2013.01); *F01N 2610/1433* (2013.01); *Y02T 10/24* (2013.01)
  USPC .......................................................... 60/295

(58) Field of Classification Search
  CPC .. F01N 2610/1433; F01N 3/208; F04B 13/00
  USPC .................................................... 60/295, 301
  See application file for complete search history.

(56) References Cited

U.S. PATENT DOCUMENTS

| 6,209,315 B1 | 4/2001 | Weigl |
| 7,866,333 B2 | 1/2011 | Boe et al. |
| 2009/0199538 A1 | 8/2009 | Boe et al. |
| 2010/0212303 A1 | 8/2010 | Jaulmes et al. |

FOREIGN PATENT DOCUMENTS

| DE | 19819579 C1 | 9/1999 |
| WO | 2007/071263 A1 | 6/2007 |

OTHER PUBLICATIONS

International Search Report of PCT/EP2011/067950, Dated Jan. 30, 2012.

*Primary Examiner* — Kenneth Bomberg
*Assistant Examiner* — Jonathan Matthias
(74) *Attorney, Agent, or Firm* — Laurence A. Greenberg; Werner H. Stemer; Ralph E. Locher

(57) ABSTRACT

A method for operating a metering apparatus for reducing agent includes providing the metering apparatus with at least one movable pump element movable between upper and lower reversal points to convey reducing agent into an exhaust-gas treatment component, and at least one position transmitter for determining a pass of the movable pump element. In the method, a first detection of a position of the movable pump element is provided by the position encoder. Subsequently, the movable pump element is moved and reducing agent is metered into the exhaust-gas treatment component. Thereupon, a second detection of a position of the movable pump element is provided by the position encoder, and subsequently a first quantity of reducing agent which is metered between the first and second detections is determined. A metering apparatus and a motor vehicle having a metering apparatus are also provided.

14 Claims, 2 Drawing Sheets

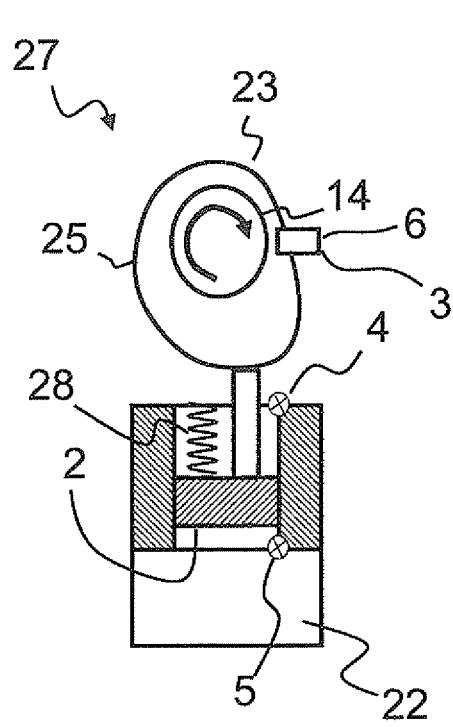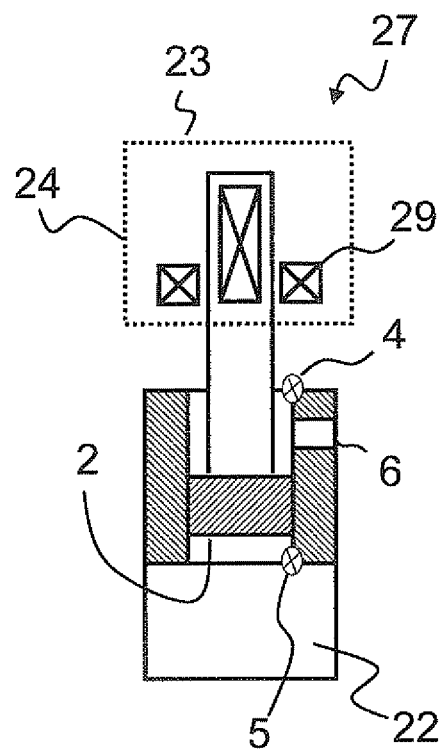
FIG. 3  FIG. 4
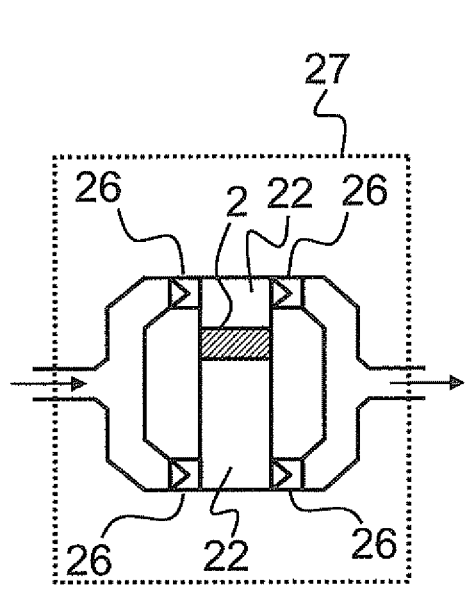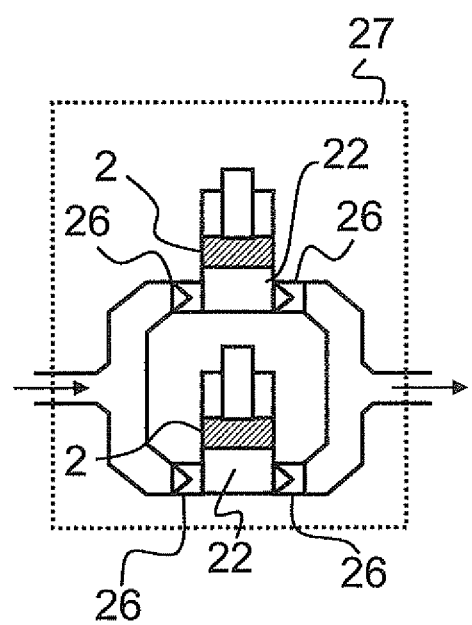
FIG. 5  FIG. 6

METHOD FOR OPERATING A METERING APPARATUS, METERING APPARATUS AND MOTOR VEHICLE HAVING A METERING APPARATUS

CROSS-REFERENCE TO RELATED APPLICATION

This application is a continuation, under 35 U.S.C. §120, of copending International Application No. PCT/EP2011/067950, filed Oct. 14, 2011, which designated the United States; this application also claims the priority, under 35 U.S.C. §119, of German Patent Application DE 10 2010 049 071.7, filed Oct. 20, 2010; the prior applications are herewith incorporated by reference in their entirety.

BACKGROUND OF THE INVENTION

Field of the Invention

The invention relates to a method for operating a metering apparatus. Metering apparatuses in which the method according to the invention can be employed are used, for example, in order to deliver reducing agent in a metered fashion into an exhaust gas treatment device of a motor vehicle. The invention also relates to a metering apparatus and a motor vehicle having a metering apparatus.

Reducing agent is required in exhaust gas treatment devices, for example, if the method of selective catalytic reduction (SCR) is employed in the exhaust gas treatment devices. In the case of that method, pollutant fractions in the exhaust gas are converted into harmless substances in a chemical reaction with the reducing agent. In that method, in particular nitrogen oxide compounds in the exhaust gas, are converted into the harmless substances, nitrogen and water. In that method, ammonia is generally used as a reducing agent. If the method is employed to purify the exhaust gases from an internal combustion engine in a motor vehicle, the reducing agent ammonia is normally not stored as such but is stored in the form of a reducing agent precursor. One such reducing agent precursor is urea or aqueous urea solution, for example. In the motor vehicle sector, a 32.5 percent aqueous urea solution, obtainable under the trademark AdBlue®, is widely used. Reducing agent precursors of that kind can be converted into ammonia within the exhaust gas and/or outside the exhaust gas, for example thermolytically using an increased temperature and/or hydrolytically using a catalyst, e.g. a hydrolysis coating. In the case of conversion within the exhaust gas, the reducing agent precursor can be fed to the exhaust gas directly in liquid form, and preferably in finely divided form. Due to the temperature of the exhaust gases, the reducing agent precursor then evaporates and is converted into the actual reducing agent, that is to say, in particular, ammonia. The term "reducing agent" is also used below for reducing agent precursors and reducing agent precursor solutions.

In the context of the method of selective catalytic reduction, it is important that the quantity of reducing agent fed to an exhaust gas treatment device should correspond particularly accurately to the existing requirement for reducing agent. On one hand, it is necessary for sufficient reducing agent to be fed in to convert the pollutant components in the exhaust gas. At the same time, the quantity of reducing agent fed in should not be too large because the excess reducing agent can lead to reducing agent being able to penetrate into the environment. Particularly, if the reducing agent has already been converted into ammonia, penetration into the environment is not desired because ammonia has a strong smell.

SUMMARY OF THE INVENTION

It is accordingly an object of the invention to provide a method for operating a metering apparatus, a metering apparatus and a motor vehicle having a metering apparatus, which overcome the hereinafore-mentioned disadvantages and further mitigate the highlighted technical problems of the heretofore-known methods, apparatuses and vehicles of this general type. In particular, the intention is to disclose a particularly advantageous method for operating a metering apparatus, with which particularly high metering accuracy with simultaneously low costs for the apparatus can be achieved.

With the foregoing and other objects in view there is provided, in accordance with the invention, a method for operating a metering apparatus for reducing agent, including at least one movable pump element, which can be moved between an upper reversal point and a lower reversal point in order to deliver reducing agent into an exhaust gas treatment component, and at least one position transmitter, with which a pass by the movable pump element can be detected. The method further comprises at least the following steps:
  a) first detection of a position of the at least one movable pump element by using the at least one position transmitter;
  b) movement of the at least one movable pump element;
  c) metering of reducing agent into the exhaust gas treatment component;
  d) second detection of a position of the movable pump element by using the at least one position transmitter; and
  e) determination of a first quantity of reducing agent metered between step a) and step d).

The movable pump element of the metering apparatus is typically a movable armature in a positive displacement pump. A positive displacement pump of this kind can be a piston pump or a diaphragm pump, for example. Positive displacement pumps should be distinguished from dynamic pumps. In positive displacement pumps, the medium to be delivered is delivered by enclosed volumes. Prevention of backflow is achieved by using valves, flaps or other elements, by using a transmission fluid, by using a special configuration of the feed pump and/or by using gravity.

In pumps referred to as dynamic pumps, in contrast, energy transfer to the medium to be delivered is accomplished exclusively by processes governed by fluid mechanics. In that case, the medium flows freely through the machine, without flaps and valves. If a dynamic pump is not driven, the medium in dynamic pumps can also flow counter to the delivery direction envisaged.

It is furthermore stated that the movable pump element can be moved between an upper reversal point and a lower reversal point. A distinction should be drawn between pumps which can only be operated with a full stroke and pumps which can be operated both with a full stroke and with a partial stroke. Pumps which can be operated only with a full stroke allow a reversal in the direction of motion of the movable pump element only at the upper reversal point and the lower reversal point. A premature reversal in the direction of motion before the upper or lower reversal point is reached is not possible with such pumps. In the case of pumps which can be operated both with a full stroke and with a partial stroke, a reduced (shorter) pump motion can also be carried out, in which the direction of motion of the movable pump element is reversed even before the upper reversal point or the lower reversal point. Such pumps can be advantageous when the intention is to make possible constant delivery rates with reduced pulsation in the flow of the delivery medium or the reducing agent.

The method according to the invention is preferably suitable for feed pumps which can be operated only with a full stroke. There can be many different variations in the technical implementation of the position transmitter, with which a pass or cycle by the movable pump element can be detected. One possible implementation is a wiper contact which is triggered as soon as the movable pump element passes the wiper contact. In another embodiment, the position transmitter can be embodied by a Hall effect sensor, which produces a signal as soon as an element of appropriate sensitivity, e.g. a small magnet from the movable pump element, passes the Hall effect sensor.

The method according to the invention is based substantially on the fact that the quantity of reducing agent which is delivered by the feed pump or the movable pump element between two passes of the movable pump element past the position transmitter, can be determined relatively accurately. For example, a (single) position transmitter can be provided, which is passed exactly twice by the movable pump element during a full stroke of the movable pump element from the upper reversal point to the lower reversal point and back to the upper reversal point. The first time can then be assigned to step a) of the method according to the invention and the second time can then be assigned to step d). Based on the knowledge of the configuration of the movable pump element and of a pump chamber which is enlarged and reduced in size by the movable pump element during the pumping process, the quantity delivered between step a) and step d) is precisely known. In particular, the displacement volume displaced by the movable pump element in the pump chamber between the upper reversal point and the lower reversal point is relevant in this case. This corresponds to the delivery volume of the pump in the case of a full stroke and, in the case of a metering apparatus with a (single) position transmitter, this displacement volume is the delivery volume moved between step a) and step d) or the first quantity metered between step a) and step d). The metering apparatus is preferably produced with such precise production tolerances that the metered or delivered quantity between step a) and step d) or between two passes of the movable pump element past the position transmitter can be determined with an error of less than 5%, preferably less than 2% and particularly preferably less than 1%. This preferably takes place in a first determination period, with the delivery volume between two passes past the at least one position transmitter being stored in the form of a constant.

The method according to the invention is preferably carried out continuously during the operation of a metering apparatus. A position of the movable pump element detected in step d) is then preferably used in the context of step a) for another iteration of the method according to the invention. In this way, the metered quantity of reducing agent can be monitored continuously.

At the beginning of operation of the metering apparatus, the method according to the invention does not necessarily have to start with step a) and/or this step can be implemented in a similar way by other measures. An operating cycle typically begins with the starting of a connected internal combustion engine. In instances where the movable pump element is far away from the position transmitter during starting, the method typically begins first of all with step b) and/or step c).

In order to carry out step e), information on step a) can then be read out from a memory (e.g. in the engine controller). In another variant, regular operation of the method including all method steps a) to e) takes place only after the movable pump element has reached the position transmitter for the first time in the respective operating cycle. It is likewise possible for step a) to be regarded as having been performed if the last existing position has been approximately recorded and stored, with the result that, when operation of the metering apparatus is started, there is then already a knowledge of the position of the movable pump element on the part of the position transmitter from the time of last operation. If appropriate, it is also possible to provide data memories, counters, etc. for this purpose, which make the position information available beyond the end of operation.

As a rule, it is necessary for the use of the method according to the invention that the reducing agent should be substantially incompressible. It is only in this way that is it possible to infer with high accuracy a required quantity of reducing agent from a movement of the movable pump element. In this case, the phrase "substantially incompressible" is typically intended to mean a compressibility on the order of the compressibility of liquid water. However, the method according to the invention can also be employed if the compressibility of the reducing agent is greater. In that case, however, the uncertainty of the quantity of reducing agent determined in step e) is greater, or the first determination method must take the compressibility into account.

In the context of the method according to the invention, it is also possible to use a metering apparatus having a plurality of position transmitters for determining a pass of the movable pump element. During a pass by the movable pump element from the upper reversal point to the lower reversal point and back to the upper reversal point, two passes of the movable pump element can take place in each case at the various position transmitters. In the case of such a metering apparatus, it is also possible, if appropriate, for relatively small metered quantities of reducing agent to be determined by using the method according to the invention because steps a) and d) can then each be carried out with different position transmitters and it is thus possible in step e) to determine even partial quantities of a full displacement volume between the upper reversal point and the lower reversal point.

In accordance with another particularly advantageous mode of the invention, the metering apparatus has at least one injector for feeding reducing agent into the exhaust gas treatment component, and at least the following steps are carried out during step c):
  i) opening of the injector;
  ii) metering of reducing agent into the exhaust gas treatment component;
  iii) closing of the injector; and
  iv) determination of a second quantity of reducing agent metered between step i) and step iii) by using a second determination method.

A second quantity of reducing agent metered between step i) and step iii) can be determined, for example, by combining the following parameters in the second determination method:
  the structural shape of the injector;
  the time between step i) and step iii);
  the significant properties of the reducing agent, such as viscosity; and
  the pressure difference between the metering apparatus and the exhaust gas treatment component.

The second determination method is preferably a calculation rule in which these parameters are taken into account. The second calculation rule can, for example, have the following structure:

$$M_2 = k \cdot (T_{iii} - T_{ii})$$

where $M_2$ is the second quantity, $T_{iii}$ is the time at which the injector closes in step iii), $T_{ii}$ is the time at which the injector opens in step ii) and k is a factor in which the various other parameters can be taken into account.

The second quantity of reducing agent metered between step i) and step iii) is normally smaller than the first quantity of reducing agent metered between step a) and step d). This is connected, on one hand, with the fact that the second quantity metered into the exhaust gas treatment component between step i) and step iii) should be small enough to ensure that sufficient evaporation and conversion of the reducing agent takes place in the exhaust gas treatment component and that no deposits form. On the other hand, the selected first quantity delivered by the movable pump element between two passes past the position transmitter should be large enough to ensure that a sufficiently large delivery quantity of reducing agent can be achieved with the metering apparatus, even under extreme operating conditions. This applies especially to metering apparatuses with a (single) position transmitter because, in this case, the first quantity corresponds to the displacement volume of the feed pump. In the case of metering apparatuses with a plurality of position transmitters, a finer resolution of the first quantities can be achieved. A metering apparatus for the method according to the invention preferably has a maximum delivery rate of 3 l/h [liters per hour] to 20 l/h [liters per hour]. The volume of reducing agent delivered by the metering apparatus or the movable pump element during a delivery stroke from the upper reversal point to the lower reversal point is preferably between 1 ml [milliliter] and 25 ml [milliliters]. In the case of a metering apparatus with a (single) position transmitter, this corresponds to the first quantity.

At the same time, a second quantity of reducing agent metered by the injector between step i) and step iii) is preferably 0.5 ml [milliliters] to 5 ml [milliliters]. The metered quantity of reducing agent in step iv) is typically determined by using a second determination method in which, for example, the parameters specified above are taken into account.

Steps i) to iv) preferably run several times during step c). There can also be overlaps between steps a) to e) and between steps i) to iv). This means that steps i) to iv) do not have to be fully completed for the method according to step c) to continue. Corresponding overlaps between method steps a) to e) and between method steps i) to iv) can be taken into account in the various determination methods as part of the method according to the invention.

The metered second quantity determined in step iv) can typically be determined with a deviation of less than 20%, preferably less than 10% and particularly preferably less than 5% from the actually metered quantity of reducing agent.

In accordance with a further particularly advantageous mode of the invention, steps i) to iv) are carried out several times between step a) and step d), and the second quantities determined in steps iv) are added in a step v) to give a third quantity and, in a step f), the first quantity is compared with the third quantity. Step f) is preferably carried out after step e).

In accordance with an added advantageous mode of the invention, the determination of the first quantity in step e) is performed with a higher accuracy than the determination of the second quantity in step iv). This condition is typically satisfied because the production tolerances for the movable pump element and the pump chamber can be maintained particularly well, and the accuracy of the second quantity determined in step e) and metered between step a) and step d) depends substantially on the production tolerances. During metering at the injector, considerable, relatively large degrees of uncertainty in the metered quantity arise due, for example, to the variable flow properties of the reducing agent, fluctuations of the pressure in the metering apparatus and in the exhaust gas treatment component, inaccuracies during the opening and closing of the injector, and possibly other factors. The high accuracy with which the metered first quantity is determined in step e) can be achieved with considerably less technical complexity than the high accuracy of determination in step iv). For this reason, a metering apparatus for the method according to the invention can be particularly inexpensive if the accuracy in step e) is greater than the accuracy in step iv).

In accordance with an additional advantageous mode of the invention, the second determination method is corrected in accordance with the first quantity and the third quantity. This can be accomplished, for example, by adaptation of the second determination method. Adaptation can be performed, for example, by correcting the constant k of the calculation rule given by way of example above: this can be carried out, for example, in accordance with the following formula:

$$k_{new} = k_{old} + P \cdot (m_1 - m_3)$$

In this formula, $k_{new}$ is the corrected factor k, where $k_{old}$ is the factor k with which the deviating second quantities and third quantities are determined. The variable $m_1$ is the first quantity while $m_3$ is the third quantity. If the second quantities determined in step iv) were too large, the factor k is reduced by this formula to the extent to which the second quantities determined were too large. Conversely, the factor k is increased if the second quantities determined were too small. The factor P determines to what extent a deviation of the first quantity from the second quantities or the third quantity affects the factor k. The formula given above corresponds substantially to a proportional controller. More complex relationships with other parameters can also be taken into account in order to carry out the adaptation of the factor k. For example, integral control components and/or differential control components can be taken into account as well. It is particularly preferred if the adaptation is carried out with a PI controller, which has a proportional controller component and an integrating controller component.

As already explained, the first quantity can be determined with a higher accuracy than is provided for the second quantity or the third quantity. The third quantity is determined by summing the second quantities. By using an appropriate adaptation of the second determination method, the high accuracy with which the first quantity can be determined can be transferred to the accuracy of determination of the second quantities. In this way it is possible to implement a method for operating a metering apparatus with a very high accuracy which also allows the metered second quantities of an individual metering operation with the injector to be calculated with a high accuracy even though a low-cost metering pump with just one position transmitter or a small number of position transmitters is being used to determine the position or passage of the movable pump element.

In accordance with yet another advantageous mode of the invention, the at least one movable pump element is driven by at least one drive embodied as a linear drive.

In accordance with yet a further advantageous mode of the invention, the at least one movable pump element is driven by at least one drive embodied as a rotary drive. The movement of a rotary drive can be transmitted to the movable pump element by using at least one connecting rod and/or by using at least one cam disk, for example.

All of these drives enable a movable pump element to be moved between an upper reversal point and a lower reversal point. A linear drive can be implemented, for example, with the aid of an electromagnet, which moves the movable pump element in a particular direction. A reverse movement can then be accomplished by using a spring element and/or by using some other elastic component, for example. With the aid of a connecting rod or of a cam disk, a rotary motion of a rotary drive can be transmitted in a particularly advantageous manner to a pump element that can be moved between an upper reversal point and a lower reversal point. In general, rotary drives can be controlled in a particularly accurate manner, making it possible to perform even very small movements of the rotary drive (e.g. a few degrees of angle). This makes it possible to deliver even partial volumes smaller than a complete delivery volume or displacement volume between an upper reversal point and a lower reversal point by using a pump element that can be moved in this way. The position transmitter does not necessarily have to determine the position of the pump element directly. The position transmitter can also be disposed on a drive element, e.g. on the rotary drive, and thus determine the position of the position transmitter indirectly.

In accordance with yet an added preferred mode of the invention, a single position transmitter is provided on the metering apparatus, with which it is possible to detect when the movable pump element passes through the upper reversal point or the lower reversal point. At the reversal points, the movable pump element preferably has a particularly low speed of motion. In this case, the pass can be determined in a particularly precise manner at a reversal point by using a position transmitter.

In accordance with yet an additional mode of the invention, if the movable pump element is driven by at least one rotary drive, it is preferred if the position transmitter is embodied as a rotation angle transmitter, with which an angle of rotation of the at least one rotary drive can be detected. Since a rotary drive in the case of the method according to the invention is normally coupled to the movable pump element by using at least one transmission device, e.g. a connecting rod or a cam disk, it is a simple matter to infer the position of the movable pump element if the angle of rotation of the rotary drive is known.

It is also possible for the metering apparatus to have two position transmitters, with it being possible, for example, for one position transmitter to detect a pass of the movable pump element at the upper reversal point, while another position transmitter can detect a pass of the movable pump element at the lower reversal point. If a plurality of position transmitters is provided, the general practice is not to monitor the same position transmitter in method steps a) and d) but typically in step d) to use the position transmitter which is passed by the movable pump element after the position transmitter taken into account in step a).

In accordance with again another advantageous mode of the invention, the metering apparatus has a pressure sensor, and a pressure measured by using the pressure sensor is used to control the movement of the movable pump element in step b). During method steps b) and c), the movable pump element is normally moved in an irregular manner because the movement of the movable pump element means that a pressure loss in the metering apparatus due to opening of the injector and metering of reducing agent into the exhaust gas treatment component by the injector has to be compensated in each case. Typically, the movable pump element is moved and stopped again several times between step a) and step d). For this purpose, the drive of the movable pump element is switched on and switched off again in each case. Typically, the movable pump element is moved whenever the injector is opened for metering. It is particularly advantageous if indirect control of the movement of the movable pump element is performed on the basis of a pressure determined by using a pressure sensor in the metering apparatus. Control of the movable pump element in accordance with the pressure is preferably performed by using a controller and, particularly preferably, by using a PID controller. A controller of this kind switches the drive on and off in each case. A controller of this kind has a proportional controller component, an integrating controller component and a differential controller component. A controller of this kind responds particularly quickly, by virtue especially of the differential controller component. At the same time, a controller of this kind provides particularly accurate control by virtue of the integrating component. For this purpose, the pressure sensor is generally disposed on a delivery side, or on an outflow side of a feed pump of the movable pump element. It is advantageous for the control, described herein, of the movable pump element, for the drive to be constructed in such a way that the movable pump element can stay in any position without energy loss. Rotary drives are therefore generally more advantageous than linear drives. A rotary drive can be constructed in a particularly advantageous manner in such a way that the angle of rotation thereof does not change when the rotary drive is switched off. In the case of linear drives, this is only technically achievable with relatively high outlay. In general, an operating voltage must be applied in this case to ensure that the movable pump element remains in a particular position.

In accordance with again a further advantageous mode of the invention, steps b) and c) run at least partially simultaneously. As soon as an injector for reducing agent is opened and, in accordance with step c), metering of reducing agent into the exhaust gas treatment component takes place, a movement of the movable pump element is carried out, advantageously with corresponding automatic control, in order to counteract a pressure drop in the metering apparatus.

With the objects of the invention in view, there is also provided a metering apparatus for reducing agent, comprising at least one movable pump element which can be moved between an upper reversal point and a lower reversal point, and at least one position transmitter with which a pass by the movable pump element can be detected.

In accordance with another advantageous feature of the invention, the metering apparatus according to the invention also has at least one pressure sensor.

A metering apparatus of this kind is particularly suitable for the method according to the invention. The apparatus features mentioned in the context of the explanations of the method according to the invention are transferable to the metering apparatus according to the invention. The same applies to the special advantages and embodiments described for the method according to the invention, which also apply to the metering apparatus according to the invention.

With the objects of the invention in view, there is concomitantly provided a motor vehicle, comprising an internal combustion engine, an exhaust gas treatment component for purifying the exhaust gases of the internal combustion engine, and a metering apparatus according to the invention and/or a control unit, which is set up or configured or programmed to carry out a method according to the invention.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a method for operating a metering apparatus, a metering apparatus and a motor vehicle having a metering apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is an enlarged, partly-sectional view of a first variant embodiment of a feed pump for the method according to the invention;

FIG. 4 is a partly-sectional view of a second variant embodiment of a feed pump for the method according to the invention;

FIG. 5 is a partly-sectional view of a third variant embodiment of a feed pump for the method according to the invention; and FIG. 6 is a partly-sectional view of a fourth variant embodiment of a feed pump for the method according to the invention.

DETAILED DESCRIPTION OF THE INVENTION

Figure 1:
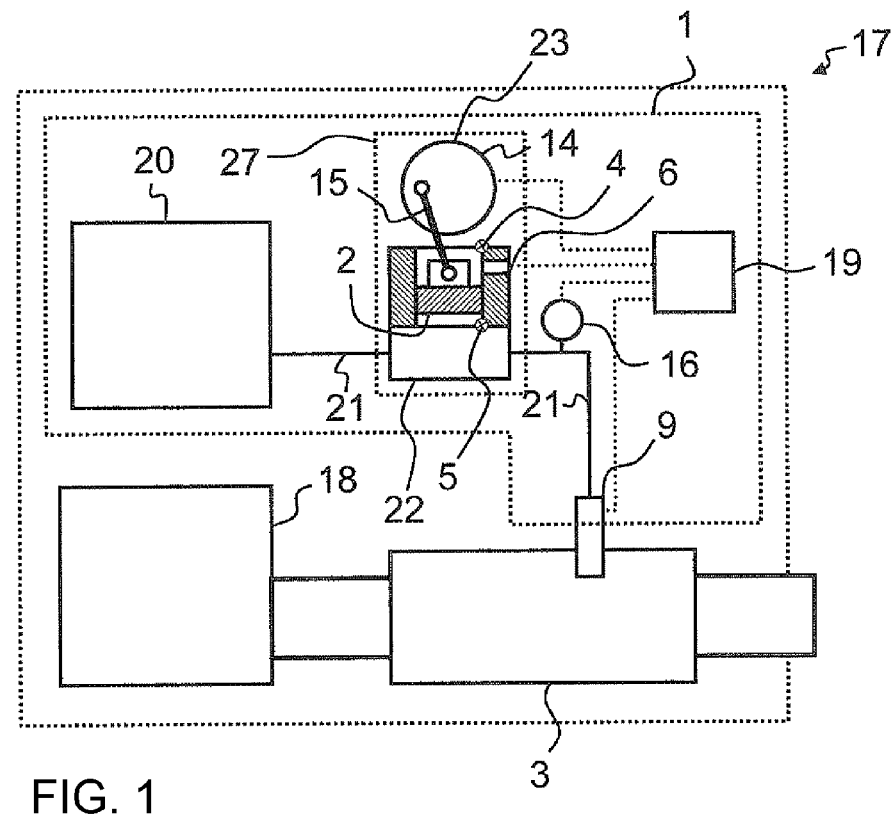
FIG. 1 is a schematic and block diagram of a motor vehicle having a metering apparatus which is configured to carry out the method according to the invention.

Referring now to the figures of the drawings in detail and first, particularly, to FIG. 1 thereof, there is seen a motor vehicle 17, which has an internal combustion engine 18 and an exhaust gas treatment component 3 for purifying exhaust gases from the internal combustion engine 18. Moreover, the motor vehicle 17 has a metering apparatus 1, with which reducing agent can be delivered into the exhaust gas treatment component 3 by an injector 9. The metering apparatus 1 includes a tank 20, in which the reducing agent is stored. A reducing agent line 21 from the tank 20 to the injector 9 first of all has a feed pump 27 and then a pressure sensor 16. The feed pump 27 has a movable pump element 2, which can be driven through a connecting rod 15 by a drive device 23 constructed as a rotary drive 14. The movable pump element 2 can be moved between an upper reversal point 4 and a lower reversal point 5. During a movement between the upper reversal point 4 and the lower reversal point 5, the movable pump element 2 changes a volume of a pump chamber 22 by a displacement volume. The position of the movable pump element 2 can be detected or determination when the movable pump element 2 passes a position transmitter or encoder 6. A control unit 19, which can be used to determine a metered first quantity of reducing agent, is connected by signal lines to the injector 9, the pressure sensor 16, the position transmitter 6 and the drive element 23.

Figure 2:
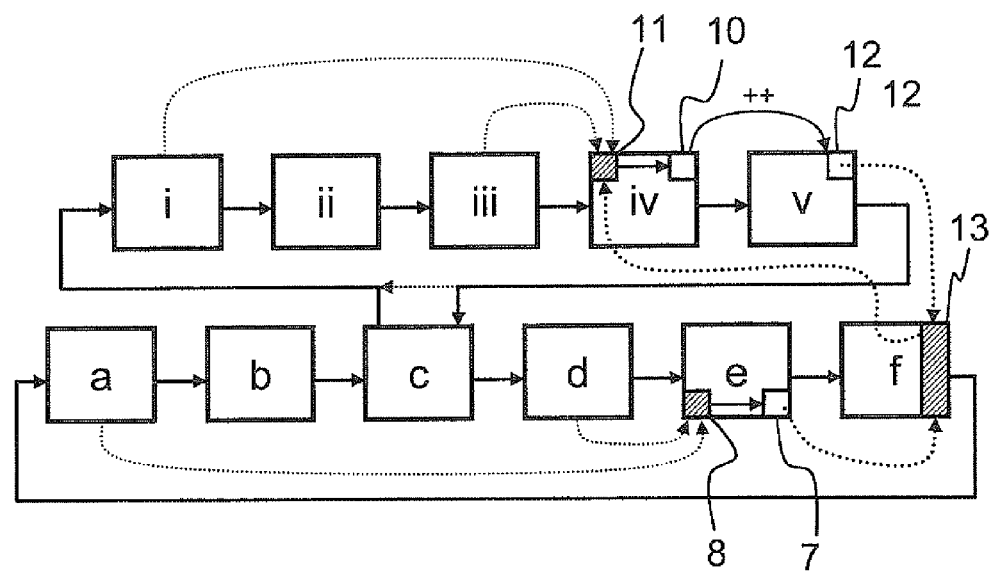
FIG. 2 is a diagram illustrating a sequence of the method according to the invention.

FIG. 2 shows a sequence diagram of a method according to the invention. Method steps a) to f) can be seen in a lower area and are being repeated iteratively in the manner of a loop. Starting from step c), method steps i) to v) can be carried out and they are likewise being repeated iteratively. During a pass or cycle through method steps a) to f), it is also possible for method steps i) to v) to be performed several times. This is indicated by a dashed arrow, which allows a repeated pass through method steps i) to v) without switching back to method step c). In step e), a first determination method 8 is used to determine a first quantity 7 from the passes, detected in method steps a) and d), of the movable pump element moving past the position transmitter or from the positions of the pump element in method steps a) and d). In the first determination method 8, a known quantity is normally read out from a memory, with this quantity corresponding to a delivery volume between step a) and step d). In the case of metering apparatuses having a plurality of position transmitters, account is taken, in the first determination method 8, for example, of which of the plurality of position transmitters has been triggered in step a) and d). In method step iv), information on the opening process of the injector in step i) and the closing process of the injector in step iii) is used to determine a second quantity 10 of metered reducing agent by using a second determination method 11. In method step v), the second quantities 10 of various passes through method steps i) to v) are added to give a third quantity 12. In method step f), the first quantity 7 and the second quantity 10 are used in a third determination method 13 to determine a correction for the second determination method 11. The correction in the third determination method 13 can be carried out, for example, with the aid of a quotient of the first quantity 7 and the third quantity 12. This quotient can be used as a correction factor in the second determination method 11.

FIGS. 3 to 6 show four different variant embodiments of a feed pump 27 for a metering apparatus, which can be used for the method according to the invention. The feed pump 27 illustrated in FIG. 3 has a drive device 23 embodied as a rotary drive 14, which transmits a rotary motion of the rotary drive 14 indicated by an arrow, through a cam disk 25, to the movable pump element 2. The movable pump element 2 can be moved between an upper reversal point 4 and a lower reversal point 5. The position of the movable pump element 2 can be detected with the aid of a position transmitter 6. In this case, the position transmitter 6 is embodied as a rotation angle transmitter 30, which determines the position of the movable pump element 2 indirectly through the angle of rotation of the rotary drive 14. The cam disk 25 is embodied as a lobed disk and, depending on the rotational angle or position of the rotary drive 14, the cam disk 25 pushes the movable pump element 2 downward to a different extent. The cam disk 25 can be embodied in such a way that the movable pump element 2 is moved at a substantially uniform speed during a reducing agent discharge phase of the feed pump 27, while the movable pump element 2 is moved significantly faster during an intake phase of the feed pump 27 for the same speed of the rotary drive 14. Through the use of such an embodiment, the intake phase, during which there is no discharge of reducing agent, can be kept particularly short. Such an embodiment of the cam disk 25 is indicated in FIG. 3. The width of the cam disk 25 increases slowly and continuously on the side of the cam disk 25 which is illustrated on the left therein, in order to move the movable pump element 2 slowly and continuously from the upper reversal point 4 to the lower reversal point 5 and to discharge reducing agent continuously. The width of the cam disk 25 decreases abruptly on the right-hand side. There is therefore a very rapid return movement of the movable pump element 2 from the lower reversal point 5 to the upper reversal point 4. In order to allow a return movement of the movable pump element 2, an additional spring element 28 can be provided in the variant embodiment of a feed pump 27 shown in FIG. 3. The spring element presses the movable pump element 2 against the cam disk 25. As an alternative or in addition, the movable pump element 2 can also be coupled mechanically to the cam disk 25, enabling the cam disk 25 both to push and pull the movable pump element 2.

In the alternative embodiment of a feed pump shown in FIG. 4, the movable pump element 2 is moved between the upper reversal point 4 and the lower reversal point 5 with the aid of a linear drive 24. A linear drive 24 of this kind can be embodied with the aid of electromagnets 29, for example.

FIG. 5 shows a feed pump 27 having a movable pump element 2 which is double acting. The movable pump element 2 shown in FIG. 5 can vary the volumes of two different pump chambers 22. The flow of reducing agent through the pump chambers 22 is determined in each case by valves 26.

FIG. 6 shows a feed pump 27 which has two movable pump elements 2, each serving separate pump chambers 22. In FIG. 6 too, the delivery direction for reducing agent through the pump chambers 22 is determined in each case by valves 26. The two movable pump elements 2 shown in FIG. 6 can have a common drive device, which is not shown therein. A drive device of this kind can be embodied by a cam disk or by one or more connecting rods, for example, which transmits the movements of the drive device to the movable pump elements 2. The feed pumps shown in FIGS. 5 and 6 allow particularly uniform delivery of reducing agent. Normally, there is an intake phase and a discharge phase in the case of a positive displacement pump, with only reducing agent to be delivered being drawn in during the intake phase and no discharge of reducing agent taking place, with the result that the flow of reducing agent provided is not continuous. In the embodiments shown in FIGS. 5 and 6, it is possible to define the respective discharge phases and intake phases for the various pump chambers 22 in such a way that the pump delivers reducing agent continuously and that there are no interruptions in the discharge of reducing agent.

The method according to the invention enables a metering apparatus with a very high metering accuracy for reducing agent to be made available at particularly low cost.

The invention claimed is:

1. A metering apparatus for feeding reducing agent to an exhaust gas treatment component, the metering apparatus comprising:
   at least one movable pump element configured to be moved between an upper reversal point and a lower reversal point;
   at least one position transmitter configured to detect a pass by said at least one movable pump element;
   at least one injector configured to feed the reducing agent from said at least one movable pump element into the exhaust gas treatment component; and
   a control unit configured to perform the following steps:
   a) carrying out a first detection of a position of said at least one movable pump element with said at least one position transmitter;
   b) moving said at least one movable pump element;
   c) metering the reducing agent into the exhaust gas treatment component by carrying out at least the following steps several times between step a) and step d):
      i) opening said at least one injector;
      ii) metering the reducing agent into the exhaust gas treatment component;
      iii) closing said at least one injector;
      iv) determining a second quantity of reducing agent metered between step i) and step iii) using a second determination method; and
      v) adding the second quantities determined in step iv) to give a third quantity;
   d) carrying out a second detection of a position of said at least one movable pump element with said at least one position transmitter;
   e) determining a first quantity of reducing agent metered between step a) and step d); and
   f) comparing the first quantity with the third quantity.

2. The metering apparatus according to claim 1, which further comprises at least one pressure sensor.

3. A motor vehicle, comprising:
   an internal combustion engine;
   an exhaust gas treatment component for purifying exhaust gases of said internal combustion engine; and
   a metering apparatus according to claim 1.

4. A method for operating a metering apparatus for reducing agent, the method comprising:
   providing a metering apparatus having at least one movable pump element movable between an upper reversal point and a lower reversal point to deliver reducing agent into an exhaust gas treatment component, at least one injector configured to feed reducing agent into the exhaust gas treatment component, and at least one position transmitter configured to detect a pass by the movable pump element;
   a) carrying out a first detection of a position of the at least one movable pump element with the at least one position transmitter;
   b) moving the at least one movable pump element;
   c) metering reducing agent into the exhaust gas treatment component by carrying out at least the following steps several times between step a) and step d):
      i) opening the injector;
      ii) metering reducing agent into the exhaust gas treatment component;
      iii) closing the injector;
      iv) determining a second quantity of reducing agent metered between step i) and step iii) using a second determination method; and
      v) adding the second quantities determined in step iv) to give a third quantity;
   d) carrying out a second detection of a position of the movable pump element with the at least one position transmitter;
   e) determining a first quantity of reducing agent metered between step a) and step d); and
   f) comparing the first quantity with the third quantity.

5. The method according to claim 4, which further comprises performing the determination of the first quantity in step e) with a higher accuracy than the determination of the second quantity in step iv).

6. The method according to claim 4, which further comprises adapting the second determination method in accordance with the first quantity and the third quantity.

7. The method according to claim 4, which further comprises driving the at least one movable pump element by at least one drive embodied as a linear drive.

8. The method according to claim 4, which further comprises driving the at least one movable pump element by at least one drive embodied as a rotary drive.

9. The method according to claim 8, which further comprises providing the at least one position transmitter as a rotation angle transmitter configured to detect an angle of rotation of the at least one rotary drive.

10. The method according to claim 4, which further comprises providing the at least one position transmitter of the metering apparatus as a single position transmitter configured to detect when the at least one movable pump element passes through the upper reversal point or the lower reversal point.

11. The method according to claim 4, which further comprises providing the metering apparatus with a pressure sensor, and using a pressure measured by the pressure sensor to control a movement of the at least one movable pump element in step b).

12. The method according to claim 4, which further comprises carrying out steps b) and c) at least partially simultaneously.

13. A motor vehicle, comprising:
an internal combustion engine;
an exhaust gas treatment component for purifying exhaust gases of said internal combustion engine; and
a control unit configured to carry out the method according to claim 4.

14. A motor vehicle, comprising:
an internal combustion engine;
an exhaust gas treatment component for purifying exhaust gases of said internal combustion engine;
a metering apparatus having at least one movable pump element configured to be moved between an upper reversal point and a lower reversal point and at least one position transmitter configured to detect a pass by said at least one movable pump element; and
a control unit configured to carry out the method according to claim 4.

* * * * *